United States Patent
Smith, II et al.

(10) Patent No.: US 7,562,036 B2
(45) Date of Patent: *Jul. 14, 2009

(54) SYSTEM AND METHOD FOR CONVEYING IMAGE ASSETS TO A RECIPIENT

(75) Inventors: Donald X. Smith, II, Corvallis, OR (US); Diane R. Hammerstad, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 127 days.

This patent is subject to a terminal disclaimer.

(21) Appl. No.: 11/985,224

(22) Filed: Nov. 14, 2007

(65) Prior Publication Data

US 2008/0162176 A1    Jul. 3, 2008

(51) Int. Cl.
*G06Q 30/00* (2006.01)
(52) U.S. Cl. .......................................... 705/26; 386/46
(58) Field of Classification Search .................. 705/26; 386/46

See application file for complete search history.

(56) References Cited

U.S. PATENT DOCUMENTS

| | | | | |
|---|---|---|---|---|
| 6,141,482 | A  * | 10/2000 | Massarksy | 386/46 |
| 6,367,991 | B1 * | 4/2002 | Garfinkle et al. | 396/639 |
| 6,992,787 | B2 * | 1/2006 | Fredlund et al. | 358/1.15 |
| 7,191,146 | B2 * | 3/2007 | Wulff et al. | 705/26 |

OTHER PUBLICATIONS

BusinessWire, Club photo extends picture CD format to consumers with online photo sharing capabilities, Oct. 5, 1999.*

* cited by examiner

*Primary Examiner*—Mark Fadok

(57) ABSTRACT

Embodiments of a system and method for conveying image assets to a recipient are disclosed. In one embodiment, a sender conveys at least one image asset to a service. The service stores a representation of the at least one image asset and a value indication on a media. The service conveys the media to the recipient after the value indication has been stored on the media.

22 Claims, 6 Drawing Sheets

SYSTEM AND METHOD FOR CONVEYING IMAGE ASSETS TO A RECIPIENT

BACKGROUND OF THE INVENTION

Over the years, photography has evolved from being primarily dependent on the analog silver halide process to the digital imaging domain. With advancements in digital cameras and electronic communications, photographic image assets can be quickly shared with virtually anyone, anywhere in the world. At the receiving end, the received photographic image assets may be printed in order to enable the recipient share in a rich photographic imaging experience.

When photographic image assets are generated using the silver halide process, the burden of reproducing and printing copies of the image assets generally falls on the sender of the image assets. For example, in the event that a photographer wishes to provide copies of photographic image assets to a recipient, the photographer is generally responsible for printing and mailing these image assets to the recipient. Thus, when the photographer has the film developed, the photographer may request "double prints" so that the image assets can be shared with the recipient.

However, when image assets are generated by way of a digital camera and transmitted electronically to a recipient the burden of converting the image assets from a digital media to a paper media falls on the recipient. This requires that the recipient have access to a high-quality printer as well as suitable print media, such as high-gloss paper, so that a high quality image asset can be printed. Thus, since the photographic experience requires the recipient to possess both equipment and supplies, the recipient is less likely to print the photographs as intended by the sender.

DESCRIPTION OF THE PREFERRED EMBODIMENTS

Figure 1:
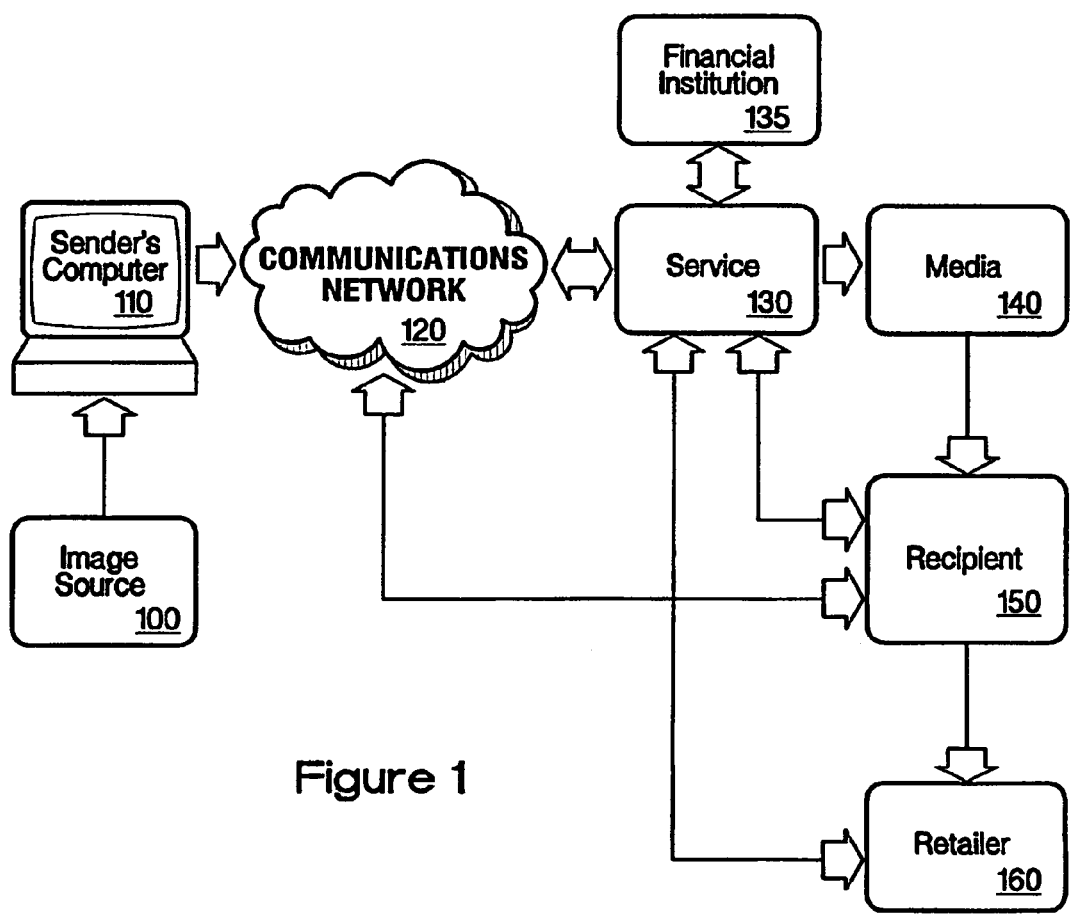
FIG. 1 is a block diagram of a system for conveying image assets to a recipient in accordance with a preferred embodiment of the invention.

FIG. 1 is a block diagram of a system for conveying image assets to a recipient in accordance with a preferred embodiment of the invention. In FIG. 1 image source 100 represents a source of or a means of storing image assets. The term "image asset" as it is used herein includes any electronic or digital representation of visual or audio information. Thus, an image asset can include still or moving pictures taken by way of a camera, camcorder, or other device that records visual imagery on an electronic or digital media. Additionally, an image asset can be an audio recording captured on a media using an appropriate audio recording device. Further, an image asset can be a copyrighted still photograph, moving picture, or audio recording downloaded and stored within image source 100.

In FIG. 1, image source 100 is at least occasionally coupled to sender's computer 110. This allows image assets to be uploaded from image source 100 and stored within sender's computer 110. These image assets can then be manipulated by a user interacting with software that runs on sender's computer 110.

Sender's computer 110 is interfaced to communications network 120. Communications network 120 represents a local area network, a wide area network, or the Internet. By way of the interface to communications network 120, sender's computer 110 transmits image assets stored within image source 100 to service 130 using, for example, an electronic messaging program. In an alternative embodiment, image source 100 interfaces with service 130 directly, and without the need for senders computer 110. In this embodiment, image source 100 executes the communications functions necessary to upload image assets to service 130 by way of communications network 120 without the intervention of sender's computer 110.

In the embodiment of FIG. 1, service 130 represents an image asset storage, reproduction, and distribution service. In this embodiment, service 130 produces media 140 that includes representations of the image assets transmitted from image source 100. Service 130 may perform image asset reproduction services such as enlargements as well as picture and multimedia arrangements in a quality-controlled environment. Service 130 may also provide long-term storage of the image assets from image source 100. Further, service 130 may also produce proofs, such as a "contact print" (described with reference to FIG. 2) in which multiple, medium or low-resolution image assets are printed on a single sheet for selection by a recipient. The medium or low-resolution image assets can also be water marked to identify and track the distribution of image assets.

Figure 2:
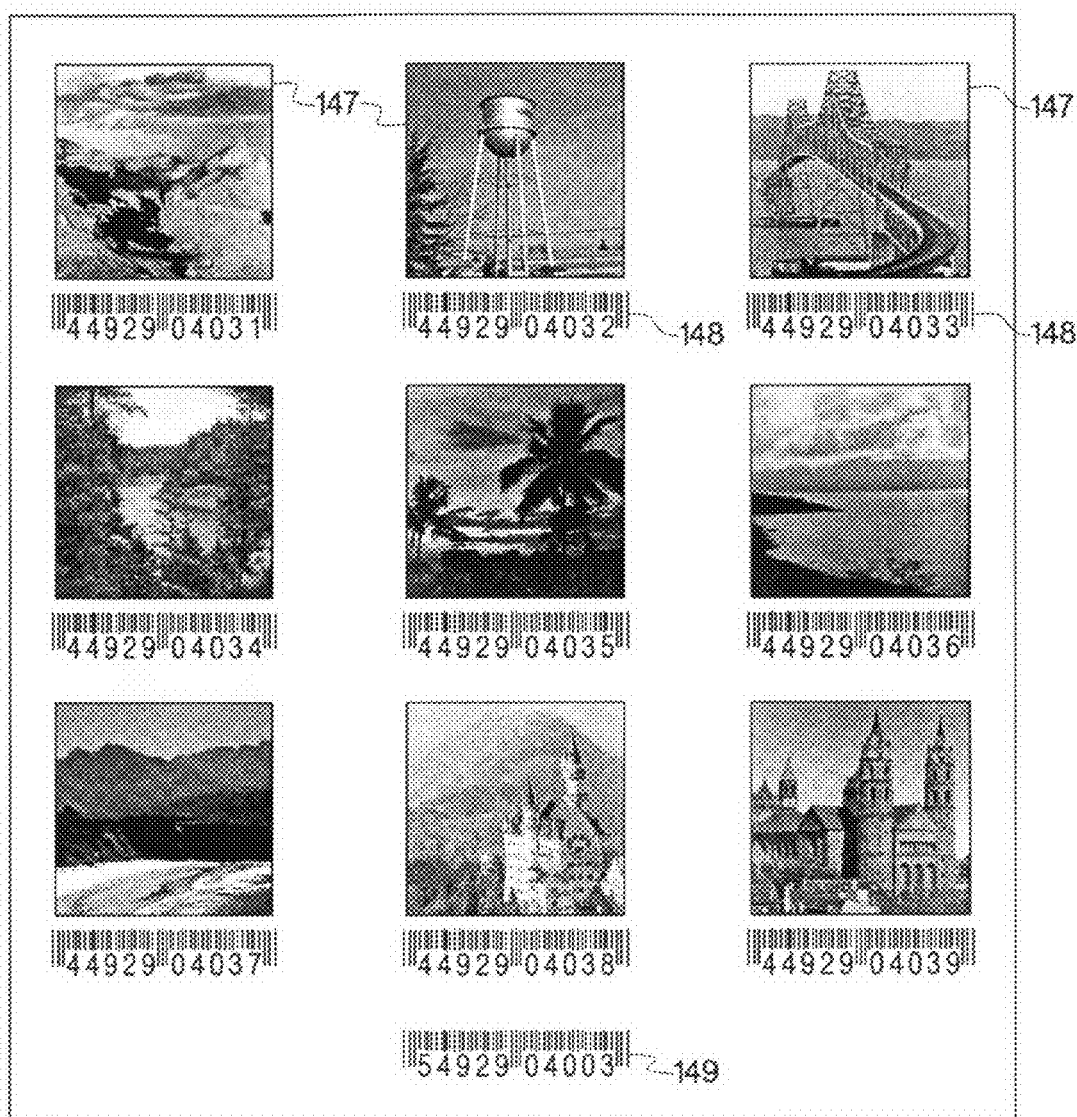
FIG. 2 shows a single sheet print media showing representations of image assets used in a system for conveying image assets to a recipient in accordance with a preferred embodiment of the invention.

In addition to representing the contact print described in reference to FIG. 2, media 140 may also represent a standard (8 or 12-cm) compact disc that includes digital representations of the image assets. Media 140 may also represent any other type of computer-readable media, such as an optical storage media of a different size, a magnetic storage media, or a solid-state storage media. The type of media may be chosen by the user of sender's computer 110 according to the hardware and software equipment capabilities of recipient 150. For example, in the event that recipient 150 possesses only a 3.5-inch disk drive, the user of sender's computer 110 may choose to have service 130 distribute representations of the image assets using a compatible 3.5-inch disk.

In addition to receiving image assets from sender's computer 110, or directly from image source 100, service 130 also receives payment information from sender's computer 110 and interacts with financial institution 135. The payment information may be in the form of an amount to be billed to a credit card number or may include information that pertains to another appropriate payment method. Therefore, financial institution 135 may represent the bank that issued the credit card used by the sender to effect payment. Alternatively, financial institution 135 can be a system for making and receiving secure payments through Internet electronic messaging, such as the Paypal™ service. The received payment information is converted by service 130 to a "value indication" and stored on media 140 along with the representations of the image assets. The value indication represents a redemption value stored on media 140. The media can then be shipped or conveyed electronically to recipient 150. Service 130 preferably maintains a ledger in which a liability indication corresponding to the value indication placed on the media is stored.

The value indication stored on media 140 may represent a predetermined monetary amount that enables recipient 150 to obtain image asset reproduction services costing up to the predetermined monetary amount. Alternatively, the payment information may instead allow recipient 150 to obtain services that include reproducing a particular number of image assets or to have the image assets manipulated in another manner. As an example, the user of sender's computer 110 can choose to store a value indication on media 140 that allows recipient 150 to select two image assets from media 140 for enlargement to an 8×10 print as well as framing, matting, and other services.

In lieu of sending media 140 to recipient 150, service 130 may transmit an electronic message such as an e-mail message to recipient 150. The message can indicate to recipient 150 that he or she may choose a number of image assets to be reproduced according to the value indication selected by the sender. If the image assets include still or moving pictures or if a suitable bandwidth connection through communications network 120 is not available, a low-resolution version (such as a thumbnail) of the image assets can be transmitted electronically to recipient 150. In the event that the image assets include an audio recording, the electronic message may include at least a sample of the audio recording. The electronic message can also include a uniform resource locator (URL) to a server associated with service 130 at which the image assets are stored.

Recipient 150 may obtain image asset reproduction services in a number of ways. For example, the image asset reproduction services may be obtained by way of recipient 150 electronically transmitting selections to service 130 in an electronic message, such as an e-mail, or by way of connecting to a web site associated with service 130. Alternatively, recipient 150 may obtain the image asset reproduction services from retailer 160 or another entity that provides these services by way of an agreement with service 130. Thus, recipient 150 can select the most convenient provider, with the monetary amount and type of service provided being specified by the user of sender's computer 110. When recipient 150 obtains the image asset reproduction services, the value indication stored on media 140 is matched with the corresponding liability indication stored by service 130. This allows service 130 to compensate retailer 160 for the services rendered to recipient 150.

The value indication stored on media 140 may also include charges imposed by service 130 to reproduce copyrighted image assets loaded onto image source 100. For example, when visiting a national park, the sender may choose to give a gift of a picture of a particular park landmark to recipient 150. In this example, the representations of the image assets can be down loaded from a public terminal located at the national park into image source 100. After conveying payment information to service 130, media 140 (which includes the copyrighted image assets as well as the value indication) can then be conveyed to recipient 150. Recipient 150, in turn, may redeem the value indication and obtain a selected high-quality print of the particular national park landmark.

Retailer 160 may operate a kiosk or other stand-alone structure that includes image asset reproduction services, such as high-quality printer for printing still photographs. Thus, recipient 150 can insert media 140 into a media receptacle (or other input device, as described in reference to FIG. 3), select the desired image asset reproduction services through an appropriate display device and receive the selected prints. The kiosk may also include other equipment for reproducing audio recordings as well as moving pictures.

Figure 4:
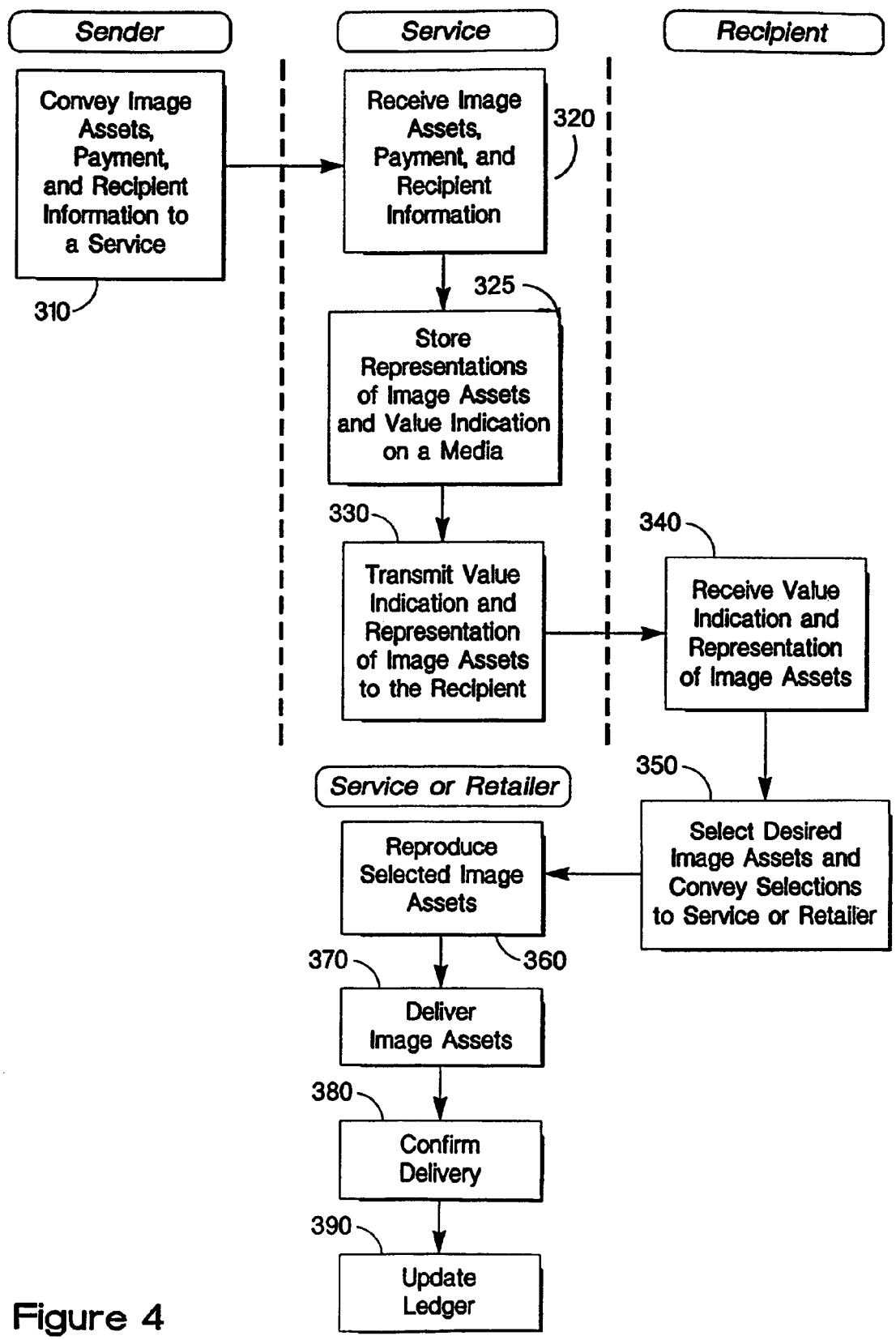
FIG. 4 is a flow chart of a method for conveying image assets to a recipient in accordance with a preferred embodiment of the invention.

In an alternative to the embodiment of FIG. 1, described in more detail in the method of FIG. 4, sender's computer 110 includes a media drive capable of writing to media 140. This allows sender's computer 110 to prepare media 140. In this embodiment, service 130 may need only receive payment information from sender's computer 110 and transmit the resulting value indication to the sender's computer. The value indication can then be stored on media 140 by sender's computer 110 along with the representations of the image assets from image source 100. The resulting version of media 140, which includes the value indication, can then be delivered to recipient 150 by way of post office mail, a private carrier, or by hand delivery. Recipient 150 can then select from the representations of the image assets present on media 140 and obtain image asset reproduction services from service 130 or from retailer 160, as described herein.

As previously mentioned, media 140 produced by service 130 may be chosen by the user of sender's computer 110 according to the hardware and software equipment capabilities of recipient 150. Thus, media 140 can represent a computer-readable media such as an optical or magnetic disk, or a solid-state storage media. However, in the event that recipient 150 possesses little or no computer resources, representations of photographic image assets can be conveyed in human-readable form to recipient 150 by way of the single sheet print media shown in FIG. 2. In FIG. 2, media 145 is a paper media, such as a contact print, in which representations of photographic image assets, 147, are printed on a single sheet. Value indication 149 is shown as being printed on media 145 in both a computer-readable form as well as a human-readable form.

In FIG. 2, image asset identifiers 148 represent both human and computer-readable indicators that identify image assets to the recipient. Thus, the recipient can select the representations of the image assets 147 on media 145 which the recipient desires to have reproduced, enlarged, or to be manipulated in another manner. In the event that image asset identifiers 148 and value indication 149 are both written in a human-readable form, image asset identifiers 148 and value indication 149 can be conveyed to the service via an electronic message, or by way of a telephone call to the service. In this scenario, recipient 150 need only convey the human-readable characters that identify value indication 149 and image asset identifiers 148, as well as quantity and print size (such as 8×10, 5×7, 4×6, and so forth) to service 130 or to an entity associated with service 130, such as retailer 160.

In the event that value indication 149 is printed using a computer-readable form, recipient 150 can bring the contact sheet of FIG. 2 to a retailer or to service 130 so that value indication 149 and image asset identifiers 148 can be scanned by a computer and conveyed to the service. The corresponding image assets can then be printed, enlarged, and so forth by the selected service or retailer. Alternatively, image assets 147 can be watermarked with each image asset identifier 148 in a manner that enables a computer at the retailer or service to identify the image asset identifiers.

In an alternative embodiment, an electronic or digital image of media 145 can be transmitted by an electronic message to the recipient. In response to receiving the electronic message, the recipient can transmit a message to the service that indicates the selections of the image assets that the recipient wishes to have printed, enlarged, or otherwise reproduced.

Figure 2A:
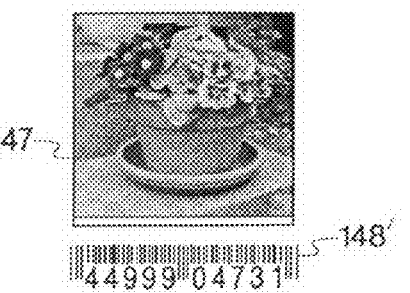
FIG. 2A shows an image asset similar to the image asset of FIG. 2, but showing more detail associated with the selection of image asset reproduction services that can be performed in accordance with a preferred embodiment of the invention.

FIG. 2A shows an image asset similar to the image asset of FIG. 2 but showing more detail associated with a selection of image asset reproduction services that can be performed. In FIG. 2A, a representation of image assets 147', is shown. Further, image asset identifier 148' shows the identification of the image asset in both computer and human-readable form. Selections 248 allow the recipient to select the desired sizes and quantities of the photographic image assets.

Figure 3:
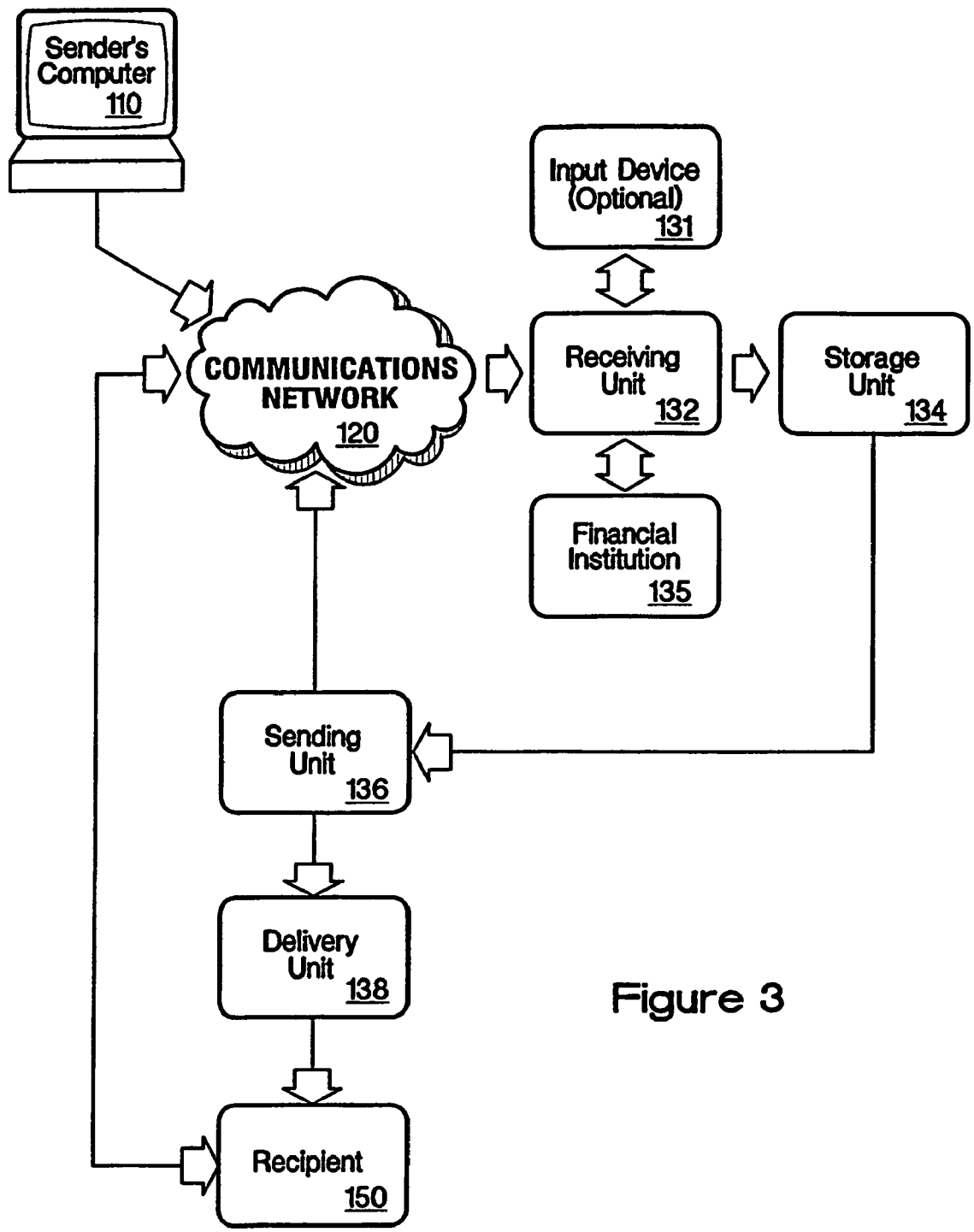
FIG. 3 is a block diagram of a service that conveys image assets to a recipient in accordance with a preferred embodiment of the invention.

FIG. 3 is a block diagram of a service that conveys image assets to a recipient in accordance with a preferred embodiment of the invention. In FIG. 3, receiving unit 132 includes an interface to communications network 120 that allows the service to receive image assets as well as payment information from sender's computer 110. Receiving unit 132 is coupled to financial institution 135, which communicates payment information in the form of a monetary amount to be billed to a credit card number or by communicating other information that pertains to another payment method.

Receiving unit 132 is also coupled to storage unit 134. Storage unit 134 stores the image assets in a form that is preferably comparable in image quality to the image asset received from the image source. The image assets are preferably stored in a long-term storage data base component of the storage unit. This allows image assets to be accessed by more than one recipient and over a period, which may be as long as a year or longer.

Storage unit 134 also stores representations of the received image assets as well as the value indication on computer-readable or human-readable media, as well as preparing the media for conveyance to the recipient. Once storage unit 134 has prepared the media to be sent to recipient 150, sending unit 136 conveys the media to recipient 150 by way of delivery unit 138. Alternatively sending unit 136 can electronically convey representations of the image assets to the recipient by way of communications network 120. Preferably the selection of the actual means of delivery is under the control of the user of the sender's computer.

In the event that sending unit 136 conveys representations of the image assets to the recipient by way of communications network 120, receiving unit 132 may additionally receive an order for printing services from recipient 150 via communications network 120. This allows recipient 150 to make image asset selections electronically and convey these selections to the service of FIG. 3.

While the value indication on media 140 is "unredeemed", meaning that a value indication has been purchased but has not been redeemed by the recipient, service 130 preferably stores information relative to the value indication in a ledger. The ledger can be kept electronically within storage unit 134. Thus, when recipient 150 redeems the value indication, such as through interaction with service 130 or retailer 160 of FIG. 1 (for example), the value indication is preferably matched with the corresponding information from storage unit 134. When the value indication is redeemed, the transaction is dosed and the funds are conveyed from the financial institution to the service or to retailer 160. However, nothing prevents the conveyance of funds to service 130 or retailer 160 at other times, such as when sender's computer 110 initially contacts service 130 or at any other time.

In an alternative embodiment of FIG. 3, the functions of receiving unit 132, storage unit 134, and sending unit 136 are performed within a self-serve kiosk or other a stand-alone structure. In this embodiment, the sender inserts a memory media from an image source by way of a media receptacle such as input device 131. The sender additionally inputs the address information of recipient 150 as well as payment information into input device 131. When the sender has entered the recipient information, payment information, and has completed uploading image assets, the sender removes the media from the input device. Representations of the image assets are then conveyed to the recipient by way of one or more of the methods described herein.

In a related embodiment, a second kiosk can be used by the recipient to reproduce image assets stored by a sender onto a digital media or other electronic device carried by the recipient. In this embodiment, the value indication is also stored on the electronic device carried by the recipient. An appropriate reading device such as input device 131 reads the electronic device, which may be a credit card-sized memory device. In addition to including the value indication, the electronic device may store other information that identifies the recipient to the input device. In response to reading the electronic device, representations of the image assets stored on the electronic device (by the sender) are to be displayed to the recipient. The recipient may then select from the representations of image assets uploaded by the sender in accordance with the value indication also stored on the electronic device. In the event that the sender has uploaded groups of image assets intended for multiple recipients, the information stored on the memory device may include information that identifies which of the uploaded groups of image assets can be accessed by a particular recipient.

FIG. 4 is a flow chart for a method of conveying image assets to a recipient in accordance with a preferred embodiment of the invention. The method of FIG. 4 can be practiced by the system for conveying image assets of FIG. 1. The method of FIG. 4 begins at step 310 in which a sender conveys image assets, payment, and recipient address information to a service. The address information supplied at step 310 may include the recipient's electronic mail address or may include the recipient's post office address. At step 320, the service receives the image assets, payment information, and recipient information.

At step 325, the service stores representations of the image assets received from sender's computer 110 on a media. Step 325 also includes the service storing the value indication to the media. At step 330, the service transmits the value indication as well as representations of image assets to the recipient. As previously mentioned, this transmission may be brought about by the service storing the representations on a computer-readable media or a human-readable media and conveying the media to the recipient. The transmission can also be brought about by sending an electronic message that conveys the image asset and the value indication to the recipient.

At step 340, the recipient receives the value indication as well as a representation of the image assets. At step 350, the recipient selects the desired image assets and conveys the selections to a service or to a retailer in accordance with the received value indication. At step 360, the service or an associated retailer performs the desired image asset reproduction services for the recipient. At step 370, the selected image assets are delivered to the recipient. At step 380 the service generates a confirmation message and transmits the confirmation message to the sender. The confirmation message may indicate to the sender which image assets were selected for reproduction by the recipient, as well as the sizes as well as the quantity and print size (such as 8×10, 5×7, 4×6, and so forth) selected by the recipient. In step 390, the service updates a ledger entry that brings about payment to the service or to the retailer from a financial institution. Step 390 can also include the service transmitting a nominal value indication to the recipient to encourage the recipient to make use of the service at a future time (with the recipient acting as a sender at the future time).

In some applications, all of the steps described in FIG. 4 may not be necessary. For example, an alternate embodiment of the invention may only include the sender conveying at least one image asset to a service (as in step 310), the service storing a representation of the at least one image asset on a media and the service storing a value indication on the media (as in step 325), and the service conveying the media to the recipient after the value indication has been added (as in step 330).

Figure 5:
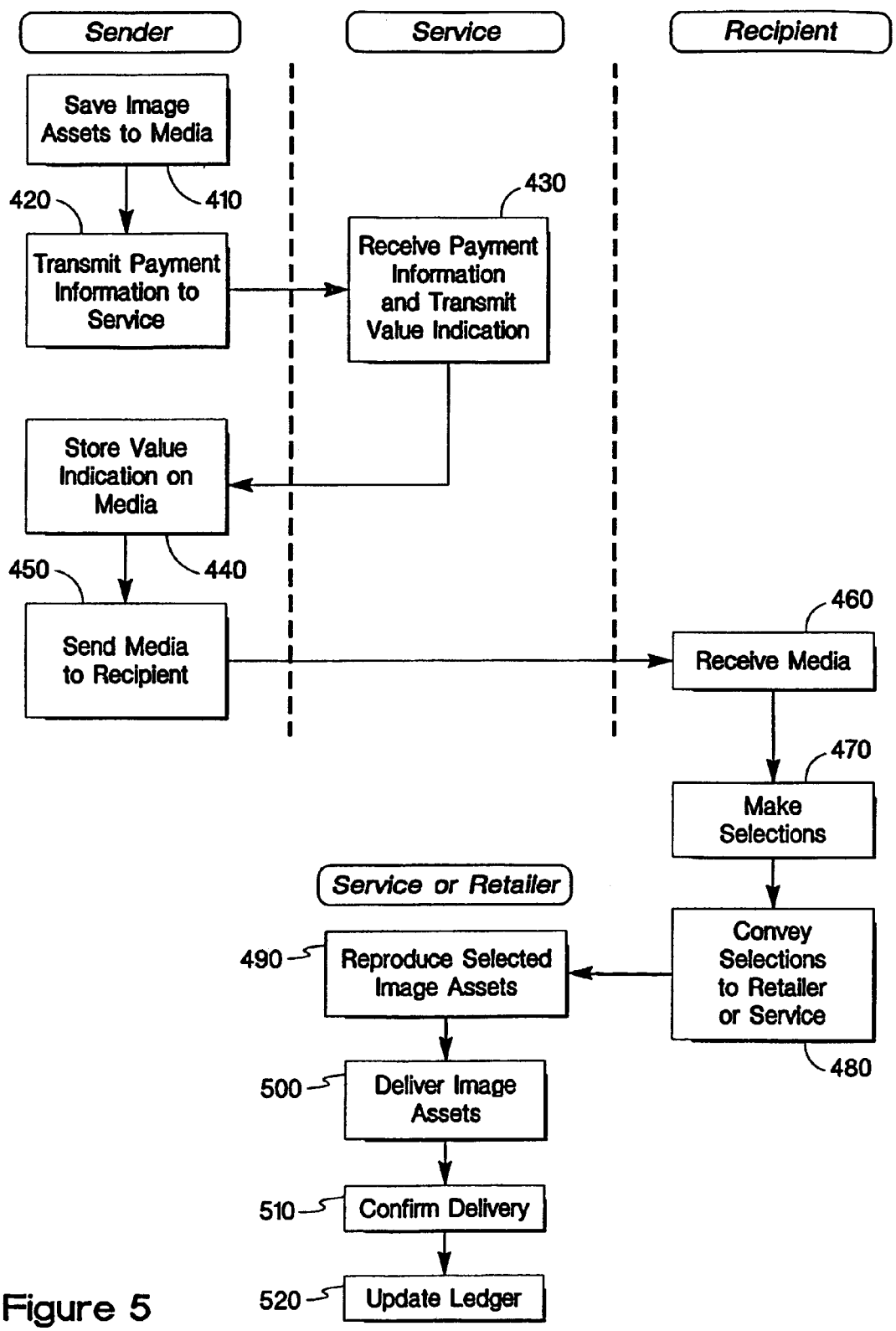
FIG. 5 is a flow chart of a second method for conveying image assets to a recipient in accordance with a preferred embodiment of the invention.

FIG. 5 is a flow chart for a second method of conveying image assets to a recipient in accordance with a preferred embodiment of the invention. The method of FIG. 5 can be practiced by the system for conveying the image assets of FIG. 3. FIG. 5 begins at step 410 in which a sender saves image assets to a media. At step 420, the sender transmits payment information to a service. At step 430, the service receives the payment information and transmits an associated value indication to the sender. At step 440, the sender's computer stores the value indication on the media. At step 450, the sender sends the media to the recipient.

The method continues at step 460 in which the recipient receives the media. At step 470 the recipient makes selections that accord with the value indication stored to the media by the sender. At step 480, the recipient conveys the selections to the service or to a retailer associated with the service in order to obtain image asset reproduction services according to the value indication. At step 490, the image assets are reproduced and delivered to the recipient, as in step 500. In step 510, the service generates a confirmation message and delivers the message to the sender. Step 510 can also include the service conveying a value indication to the recipient to encourage the recipient to make use of the service at a future time (with the recipient acting as a sender). At step 520, the service or retailer updates a ledger entry that brings about payment from a financial institution to the service or retailer.

Steps 420 through 440 of FIG. 5 can be performed by way of a kiosk or other stand-alone structure. In this alternative embodiment, step 420 includes a sender entering payment information into a kiosk prior to the payment information being transmitted to the service. In step 430, the service receives the payment information and transmits a corresponding value indication from the service to the kiosk. In step 440, the sender inserts an electronic media, such as a compact disc having image assets stored thereon, and stores the value indication on the media. At step 450, the sender conveys the media to the recipient.

In some applications, all of the steps described in FIG. 5 may not be necessary. For example, an alternate embodiment of the invention may only include the sender storing a representation of at least one image asset on a media (as in step 410), the sender receiving a value indication from the service and the sender storing the value indication on the media (as in step 440), and the sender sending the media to a recipient (as in step 450).

Figure 6:
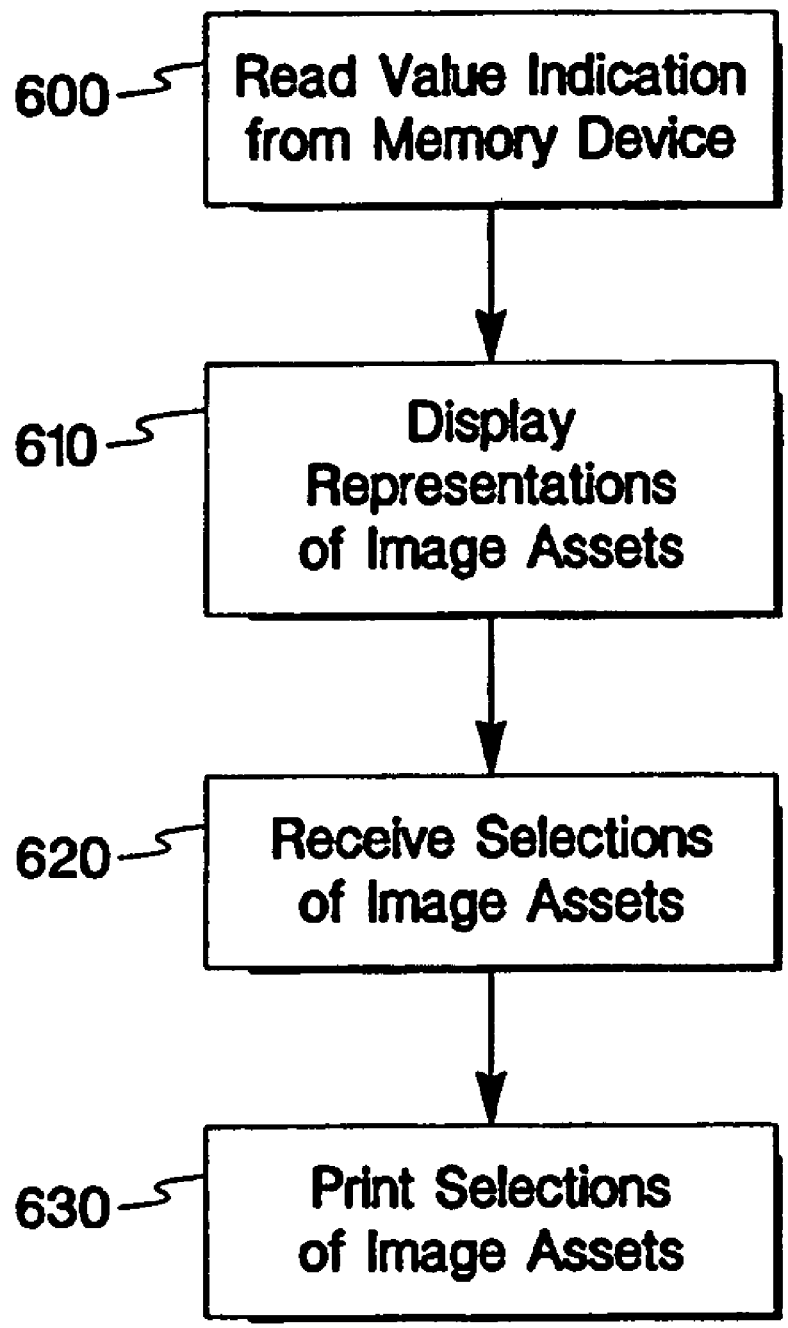
FIG. 6 is a flow chart of a third method for receiving image assets by a recipient in accordance with a preferred embodiment of the invention.

FIG. 6 is a flow chart of a third method for receiving image assets by a recipient in accordance with a preferred embodiment of the invention. The method of FIG. 6 can be performed by a kiosk or other stand-alone structure that includes an input device, display, keyboard, and interface to a service (such as service 130). At step 600, an input device reads a value indication from a memory device. Step 600 can be brought about by way of the recipient inserting a credit card-sized memory device may make use of a magnetic stripe to store the value indication, or may make use of an input device of a kiosk. The credit card-sized device may be an optical media that stores image assets or may be a human readable media that uses a bar code to encode the value indication in an alternative embodiment, the memory device responds to a wireless interrogation from the input device by transmitting the value indication to the input device.

At step 610, representations of the image assets are displayed in response to the received value indication. It is contemplated that the display of the image assets by the kiosk display unit is the result of the kiosk interface to service 130 reading a storage unit (such as the storage unit of service 130) so that the representations of the image assets can be displayed to the recipient. At step 620, the selections of the image assets are received from the recipient. Step 620 may also include receiving size selections (such as 4×6, 5×7, 8×10, and so forth) as well as quantity descriptions. At step 630, the selected image assets are printed at the kiosk for the recipient.

In the embodiments described herein, it has been assumed that the image asset reproduction services are always provided to the satisfaction of the recipient. However, in the event that the quality of the services is lacking in some manner, nothing prevents the recipient returning the reproduced image assets to the service or retailer so that the services can be improved upon. In the event that the recipient continues to be unsatisfied, the service or retailer may choose to arrange for the image asset reproduction services be provided by an associated retailer by storing a second value indication on the media.

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A method for conveying at least one image asset to a recipient, comprising:
   a sender conveying the at least one image asset to a first self-serve kiosk service;
   the first self-serve kiosk service storing a representation of the at least one image asset on a computer readable media;
   storing a sender established value indication and identification information of the recipient on the computer readable media; and
   using a second self serve kiosk by the recipient to reproduce image assets of the sender stored on the media onto a digital media after the value indication has been determined by the second self-serve kiosk;
   wherein the value indication indicates that a predetermined number of the at least one image assets stored on the media may be reproduced by one of the group consisting of a retailer and the service without cost to the recipient.

2. The method of claim 1, wherein the first conveying step includes uploading the at least one image asset by way of a communications network between the sender and the service.

3. The method of claim 1, wherein the value indication indicates that the recipient may obtain image asset reproduction services up to a predetermined monetary amount from one of the group consisting of a retailer and the service.

4. The method of claim 1, wherein the media is a computer-readable media.

5. The method of claim 4, wherein the media is an optical disk.

6. The method of claim 4, wherein the media is a magnetic media.

7. The method of claim 4, wherein the media is a solid-state media.

8. The method of claim 1, wherein the media is a human-readable media.

9. method of claim 8, wherein the media includes a plurality of image assets printed on a single sheet of paper.

10. method of claim 9, wherein the paper includes the value indication printed in a computer-readable form.

11. method of claim 10, wherein the value indication is a digital watermark printed with the plurality of image assets printed on the single sheet of paper.

12. method of claim 9, wherein the paper includes the value indication printed in a human-readable form.

13. A method for use with a first self serve kiosk coupled to a second self serve kiosk of a service that conveys an image asset to a recipient, comprising:
   using a receiving unit of the first self serve kiosk that receives at least one image asset and payment information from a sender;
   using a storage unit of the first self serve kiosk, coupled to the receiving unit and the second self serve kiosk, that stores a representation of the at least one image asset on a computer readable media, the storage unit additionally storing a sender established value indication, which results from the payment information, on the computer readable media; and
   using the second self serve kiosk by the recipient to reproduce image assets of the sender stored on the computer readable media onto a digital media after a value indication has been determined by the second self-serve kiosk.

14. The service of claim 13, wherein the receiving unit further comprises an interface to a communications network.

15. The service of claim 13, wherein the value indication indicates that a predetermined number of the at least one image assets stored on the media may be reproduced by one of the group consisting of a retailer and the service without cost to the recipient.

16. The service of claim 13, wherein the value indication indicates that the recipient may obtain image asset reproduction services from one of the group consisting of a retailer and the service up to a predetermined monetary amount.

17. The service of claim 13, wherein the media is a computer-readable media and wherein the representation is a digital representation of the at least one image asset.

18. The service of claim 13, wherein the media is human-readable and wherein representations of image assets are printed on a single sheet.

19. The service of claim 18, wherein the media includes a plurality of image assets printed on paper.

20. The service of claim 19, wherein the paper includes the value indication printed in a computer-readable form.

21. The service of claim 19, wherein the paper includes the value indication printed as a watermark.

22. service of claim 19, wherein the paper includes the value indication printed in a human-readable form.

* * * * *